US010159274B2

(12) United States Patent
Ostrzyzek (10) Patent No.: US 10,159,274 B2
(45) Date of Patent: Dec. 25, 2018

(54) METHOD AND APPARATUS FOR SHIFTING OF ROD-LIKE ARTICLES, AND APPARATUS OF SHIFTING OF ROD-LIKE ARTICLES (71) Applicant: International Tobacco Machinery Poland Sp. z o. o., Radom (PL)

(72) Inventor: Artur Ostrzyzek, Radom (PL)

(73) Assignee: International Tobacco Machinery Poland Sp. z o. o., Radom (PL)

( * ) Notice: Subject to any disclaimer, the term of this patent is extended or adjusted under 35 U.S.C. 154(b) by 0 days.

(21) Appl. No.: 15/741,504

(22) PCT Filed: Jul. 7, 2016

(86) PCT No.: PCT/IB2016/054070
§ 371 (c)(1),
(2) Date: Jan. 3, 2018

(87) PCT Pub. No.: WO2017/009747
PCT Pub. Date: Jan. 19, 2017

(65) Prior Publication Data
US 2018/0192689 A1    Jul. 12, 2018

(30) Foreign Application Priority Data
Jul. 16, 2015   (PL) .......................... 413137

(51) Int. Cl.
*A24C 5/32*  (2006.01)
*A24C 5/47*  (2006.01)
(Continued)

(52) U.S. Cl.
CPC .............. *A24C 5/327* (2013.01); *A24C 5/478* (2013.01); *B65G 47/28* (2013.01); *B65G 47/82* (2013.01); *B65G 2201/0226* (2013.01)

(58) Field of Classification Search
CPC ...... B65G 47/28; B65G 47/82; B65G 47/847; B65G 47/848; B65G 2201/0226; A24C 5/327; A24C 5/478
See application file for complete search history.

(56) References Cited

U.S. PATENT DOCUMENTS 2,821,201 A * 1/1958 Schmalfeldt ........... A24C 5/471
131/94
2,902,040 A * 9/1959 Schubert ................ A24C 5/471
131/94
(Continued)

FOREIGN PATENT DOCUMENTS

DE        954038      12/1956
DE       1008173       9/1957
(Continued)

OTHER PUBLICATIONS

International Search Report for application No. PCT/IB2016/054070, dated Mar. 11, 2016.
(Continued)

*Primary Examiner* — Gene O Crawford
*Assistant Examiner* — Keith R Campbell
(74) *Attorney, Agent, or Firm* — Oppedahl Patent Law Firm LLC (57) ABSTRACT An apparatus (10, 20, 30, 40) for shifting of rod-like articles (4, 4') with different lengths or rod-like article groups (6) with different total lengths on a drum conveyor (3), comprising slidably mounted pusher elements (7, 27, 37) acting on at least one rod-like article (4, 4') or at least one rod-like article group (6) so as to vary their position in the flute (3) of the drum conveyor (2), with the pusher elements (7, 27, 37) being 5 slidable in a direction substantially corresponding to the axis of the rod-like articles, and a pushing unit (5, 25, 35) mounted angularly relative to the pusher elements (7, 27, 37) forcing the movement of the pusher elements (7, 27,

(Continued)

37), whereas the pushing unit comprises rotational pushing elements for pushing against the pusher elements (7, 27, 37). The apparatus is characterized in that the pushing unit (5, 25, 35) is moveably mounted in a direction being substantially transverse to the axis of the flute (3) of the drum 10 conveyor (2) so as to shift the rod-like articles (4, 4') or the rod-like article groups (6) inside the flute (3) of the drum conveyor (2).

11 Claims, 7 Drawing Sheets

(51) Int. Cl.
*B65G 47/28* (2006.01)
*B65G 47/82* (2006.01)

(56) References Cited

U.S. PATENT DOCUMENTS

| | | | |
|---|---|---|---|
| 3,094,128 A * | 6/1963 | Dearsley | A24C 5/471 |
| | | | 131/289 |
| 3,343,647 A | 9/1967 | Preston et al. | |
| 6,425,400 B1 * | 7/2002 | Krause | A24C 5/327 |
| | | | 131/280 |
| 7,296,579 B2 * | 11/2007 | Focke | A24C 5/471 |
| | | | 131/94 |
| 9,963,260 B2 * | 5/2018 | Cadieux | B65C 9/02 |
| 2004/0255963 A1 | 12/2004 | Focke et al. | |
| 2006/0201525 A1 * | 9/2006 | Meins | A24C 5/28 |
| | | | 131/282 |
| 2015/0291301 A1 * | 10/2015 | Cadieux | A24F 47/008 |
| | | | 156/185 |
| 2018/0098566 A1 * | 4/2018 | Sikora | A24C 5/478 |

FOREIGN PATENT DOCUMENTS

| | | |
|---|---|---|
| EP | 1033083 A1 | 9/2000 |
| EP | 1913822 A2 | 4/2008 |
| WO | 03/043449 A1 | 5/2003 |

OTHER PUBLICATIONS

Written Opinion of the International Searching Authority for application No. PCT/IB2016/054070, dated Mar. 11, 2016.

\* cited by examiner

METHOD AND APPARATUS FOR SHIFTING OF ROD-LIKE ARTICLES, AND APPARATUS OF SHIFTING OF ROD-LIKE ARTICLES

The object of the invention is a method for shifting of rod-like articles, and an apparatus for shifting of rod-like articles.

Methods and an apparatus according to the invention are used in tobacco industry machines on drum conveyors provided with flutes to convey individual rod-like articles or rod-like article groups. The rod-like articles may be held in the flutes by means of an external guiding jacket or by means of negative pressure supplied to holes made in the flute bottoms. Furthermore, it is possible to shift the articles along the flutes in order to set their position before the next operation to which they will be subjected. For example, it may be the cutting of the articles within the same conveyor or the transfer of a whole prepared article group to a next conveying unit where they will be wrapped into a wrapping material.

In the prior art, the document U.S. Pat. No. 3,094,128 (US '128) disclosing an apparatus for shifting of rod-like articles in flutes of a drum conveyor is known. The apparatus according to US '128 comprises slidably mounted pusher elements which shift the rod-like articles inside the flute of the drum conveyor. The pusher elements of the known solution are pushed to abut at a fixed angle by a rotatably mounted pushing element. The apparatus discloses a method for aligning the position of rod-like articles and may be used in case of rod-like articles of a constant length. A problem which remains unsolved in the prior art is how to push to abut the rod-like articles of different lengths, in particular there is a problem of centering of rod-like articles of different lengths, i.e. such positioning of articles in the flutes of the drum conveyor that the centres of rod-like articles or rod-like article groups would be situated substantially in a common plane.

The object of the invention is a method for shifting of rod-like articles wherein: at least one rod-like article or a rod-like article group is conveyed in a flute situated on the circumference of a drum conveyor, whereas the lengths of the rod-like articles or the total lengths of the rod-like article groups in each of the flutes may vary.

The method according to the invention is characterised in that a pushing unit is shifted in a direction being substantially transverse to the axis of the flute of the drum conveyor. Then, by means of the pushing unit surfaces being situated angularly relative to pusher elements which are slidably mounted in the direction of the flute axis, the force exerted by the pushing unit is directed on the pusher elements, then the rod-like articles or the rod-like article groups are axially shifted in the flutes by means of the pusher elements.

Due to the angular positioning of the surfaces transferring the force from the pushing unit to the pusher elements, a favourable effect of pushing the articles to abut with a force being suitable for the joint is achieved. After pushing the articles to abut, the rigidity of the rod-like articles will cause that the movement of the pushing unit will be stopped, which is particularly favourable when the total lengths of rod-like article groups vary in successive flutes. In such a case, the pushing unit will drop to a different depth because the rod-like article groups will stop it earlier or later depending on their length.

The method according to the invention is characterised in that at least two pushing units mounted on both sides of the flute of the drum conveyor are angularly shifted relative to the pusher elements substantially in the direction of the axis of the rod-like article or the rod-like article group. Afterwards, by means of the pushing unit surfaces mounted on both sides of the flute of the drum conveyor, the force exerted by the pushing unit is directed on the pusher elements, and then by means of the pusher elements the rod-like articles or the rod-like article groups are axially shifted in the flutes so that the centres of rod-like articles or rod-like article groups in the flutes of the drum conveyor are positioned substantially in a common plane.

Due to the use of at least two pushing units symmetrically acting from both sides on the rod-like article group, a favourable effect of centering of rod-like articles is achieved as a result of the fact that the forces from the pusher elements act on the front surfaces on the same sections of the flute. Since the pushing units are rigidly connected with each other, the system finds a point of equilibrium of forces and fixes its position when the rod-like article or the rod-like article group is centered between the pushing units.

The object of the invention is also an apparatus for shifting of rod-like articles with different lengths or rod-like article groups with different total lengths on a drum conveyor, comprising slidably mounted pusher elements acting on at least one rod-like article or at least one rod-like article group so as to vary their position in the flute of the drum conveyor, the pusher elements being slidable in a direction which substantially corresponds to the axis of the rod-like articles, and a pushing unit mounted angularly relative to the pusher elements and forcing a movement of the pusher elements, whereas the pushing unit comprises rotational pushing elements for pushing against the pusher elements.

The apparatus according to the invention is characterised in that the pushing unit is movably mounted in a direction being substantially transverse to the axis of the flute of the drum conveyor so as to shift the rod-like articles or the rod-like article groups inside the flute of the drum conveyor.

Due to the angular positioning of the surfaces transferring the force from the pushing unit to the pusher elements, a favourable effect of pushing the elements with a suitable force is achieved.

The apparatus according to the invention is characterised by comprising at least two slidable pusher elements mounted on both sides of the flute of the drum conveyor, acting on at least one rod-like article or at least one rod-like article group so as to vary their position in the flute of the drum conveyor, and at least two pushing units mounted angularly relative to the pusher elements on both sides of the flute of the drum conveyor, whereas the pushing units are movably mounted in a direction being substantially transverse to the axis of the flute of the drum conveyor so as to shift, through the pusher elements, the rod-like articles or the rod-like article groups inside the flute of the drum conveyor so that the centres of the rod-like articles or the rod-like article groups in the flutes of the drum conveyor position themselves substantially in a common plane.

Due to the use of at least two pushing units symmetrically acting from both sides on a rod-like article group, a favourable effect of centering of the rod-like articles is achieved.

The apparatus according to the invention is characterised in that the contact of the rotational pushing elements of the pushing unit with the pusher element is accomplished by means of a spring.

The apparatus according to the invention is characterised in that the rotational pushing elements have circumferential surfaces selected from the group: conical, spherical, cylindrical, paraboloidal surface.

The apparatus according to the invention is characterised in that the pusher elements have surfaces remaining in contact with the rotational pushing elements selected from the group: conical, spherical, cylindrical, paraboloidal surface.

The apparatus according to the invention is characterised in that the pusher elements are pneumatically moved outside the drum conveyor.

The apparatus according to the invention is characterised in that the pusher elements are moved outside the drum conveyor by means of a spring.

The apparatus according to the invention is characterised in that the pusher elements are mounted in rotatable rings.

The apparatus according to the invention is characterised in that the pusher elements have an axis of rotation parallel to the axis of the drum conveyor.

The disclosed apparatus according to the invention has a very simple structure and at the same time it is reliable in operation. The apparatus allows the positioning of rod-like articles of different lengths, thus avoiding the necessity of precise sorting thereof with regard to the length.

The object of the invention was shown in detail in a preferred embodiment in a drawing in which.

Figure 1:
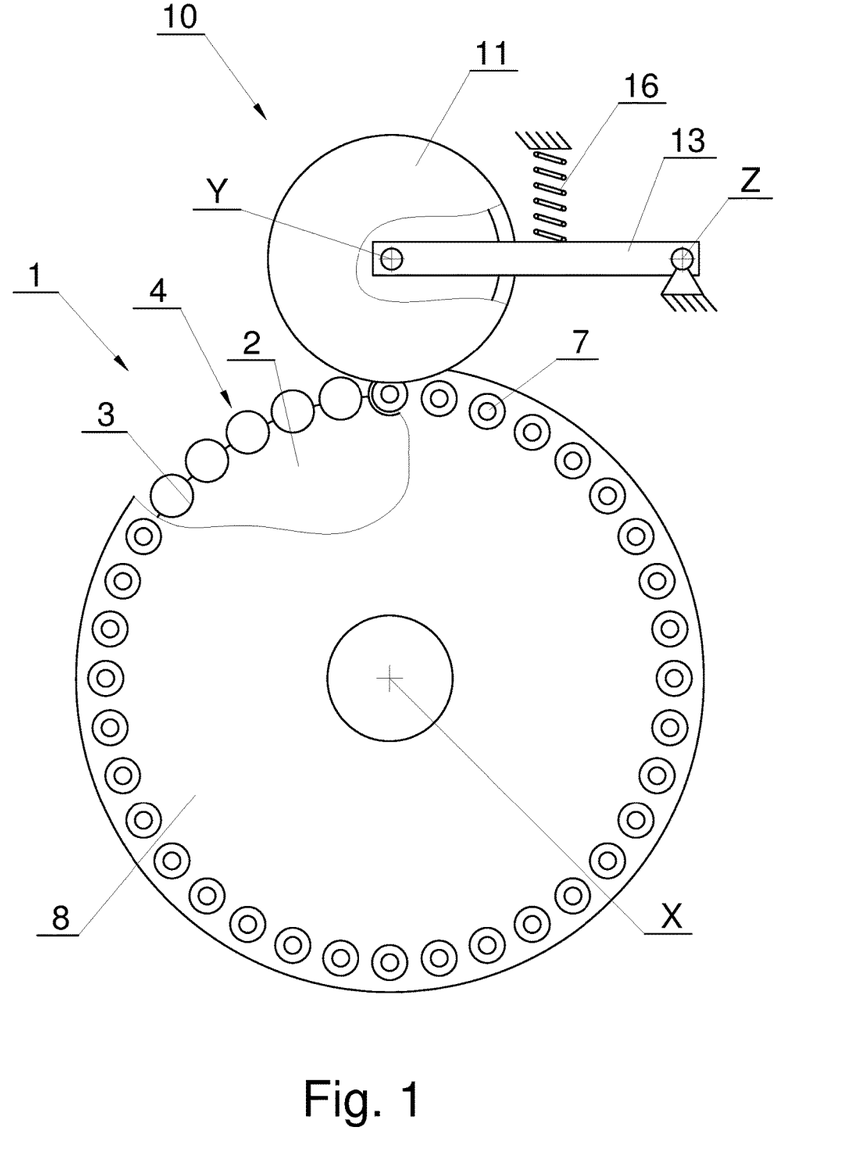
FIG. 1—shows a drum conveyor in an axial view.
Figure 2A:
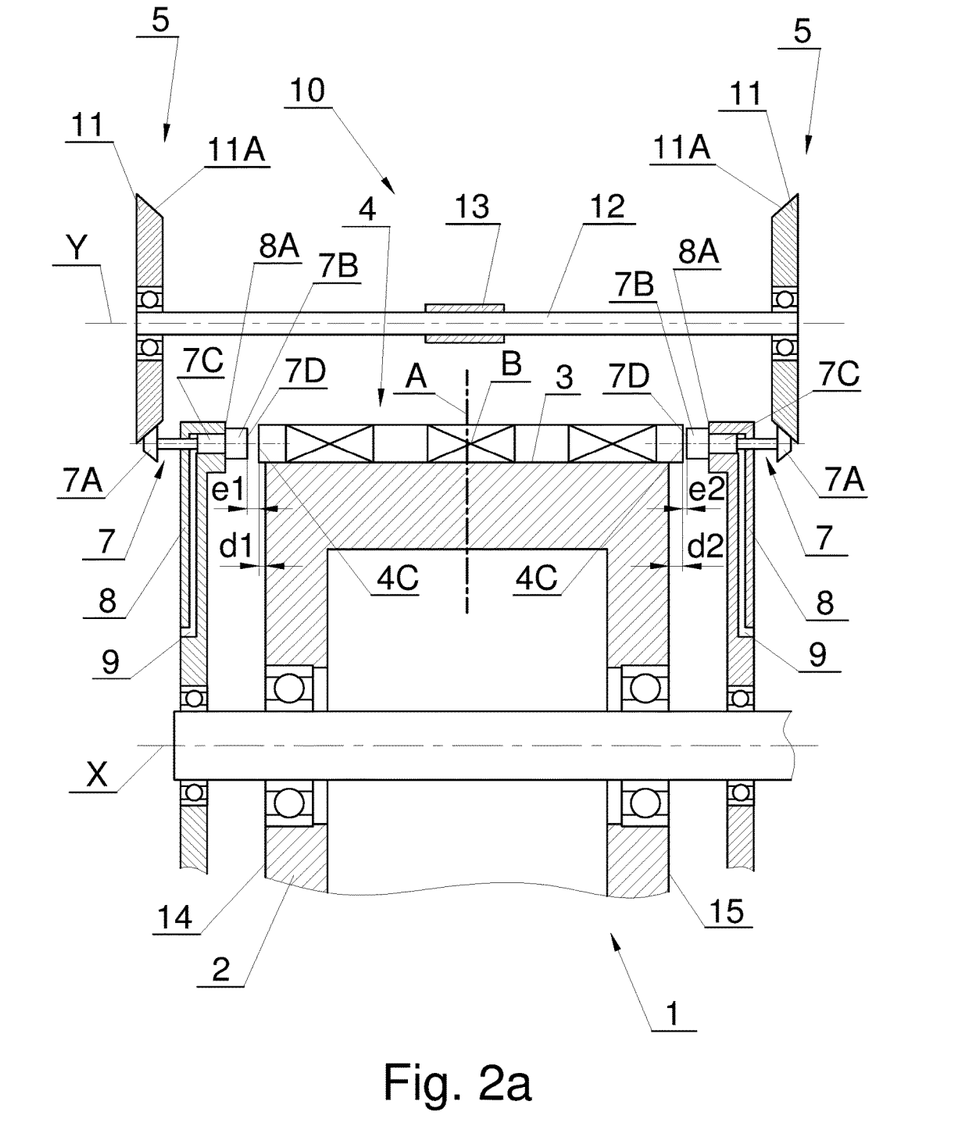
FIG. 2a, 2b—show an axial section through the conveyor of FIG. 1 in the initial and final stages of shifting of rod-like articles in a flute of the conveyor in a first embodiment.
Figure 6:
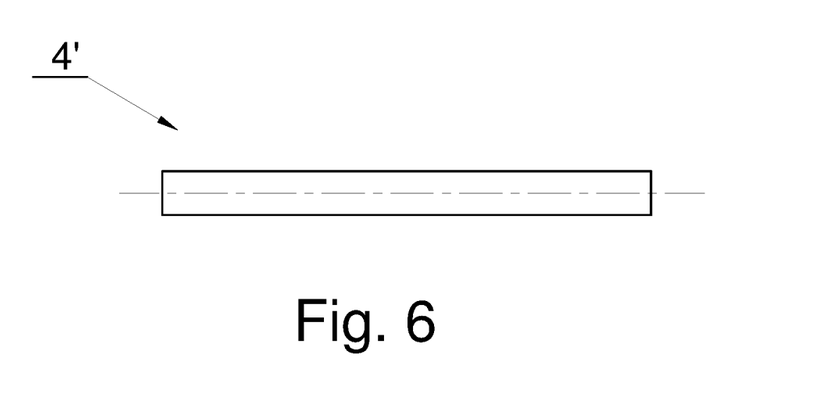
FIG. 6—shows an individual rod-like article.

A drum conveyor 1 shown in FIG. 1 and FIG. 2 comprises a drum 2 adapted to rotate around the axis of rotation X. The drum 2 has, on its circumference, a plurality of flutes 3 for conveying of rod-like articles 4 transversely to the axis of the articles 4, the flutes 3 being situated parallel to the axis of rotation X of the drum 2. The rod-like articles 4 are placed into the flutes 3 of the drum 2, whereas the articles 4 are usually placed into the flutes 3 by a preceding conveyor. FIG. 2a shows a rod-like article 4 in the form of a multi-element rod, in other words, it is a rod-like article group joined with a common wrapping material. The multi-element rod 4 shown in FIG. 6 is built of rod-like articles 4A, 4B, and 4B' alternately situated along the axis (a half of the article 4B) and is wrapped with a common wrapping material 5. The rod-like articles are usually held in the flutes by means of negative pressure supplied through holes situated along the flutes 3 (the negative pressure holes are not shown). At the ends of each flute 3 are situated pusher elements 7 slidably mounted in discs 8 rotatably mounted on the axis X, with the discs 8 rotating at the same rotational speed as the drum 2. The pusher elements 7 may have the form of elements comprising a conical portion 7A and cylindrical portions 7C and 7B where the portion 7C is used to mount the slidable pusher elements 7, the portion 7B is used to push the article 4, and the portion 7A is pushed by the rotational pushing element 11 belonging to a pushing unit 5 of a shifting apparatus 10. As a result of the operation of the apparatus 10 for shifting of rod-like articles, the pusher elements 7 are pushed against the rod-like article 4, and after the pushing the shifting of the article 4 takes place. The pusher element 7 may also have a different form being slidable along the axis of the article 4 wherein the slidable portion has the form of a non-rotatable body. The portion 7B which is used to push the article 4 may have a flat end on the side of the rod-like article 4. The portion 7A which is pushed by the pushing unit 5 should have the form of a rotatable body, for example it may be cylindrical, conical, spherical or may have the form of a rotational paraboloid.

Figure 2B:
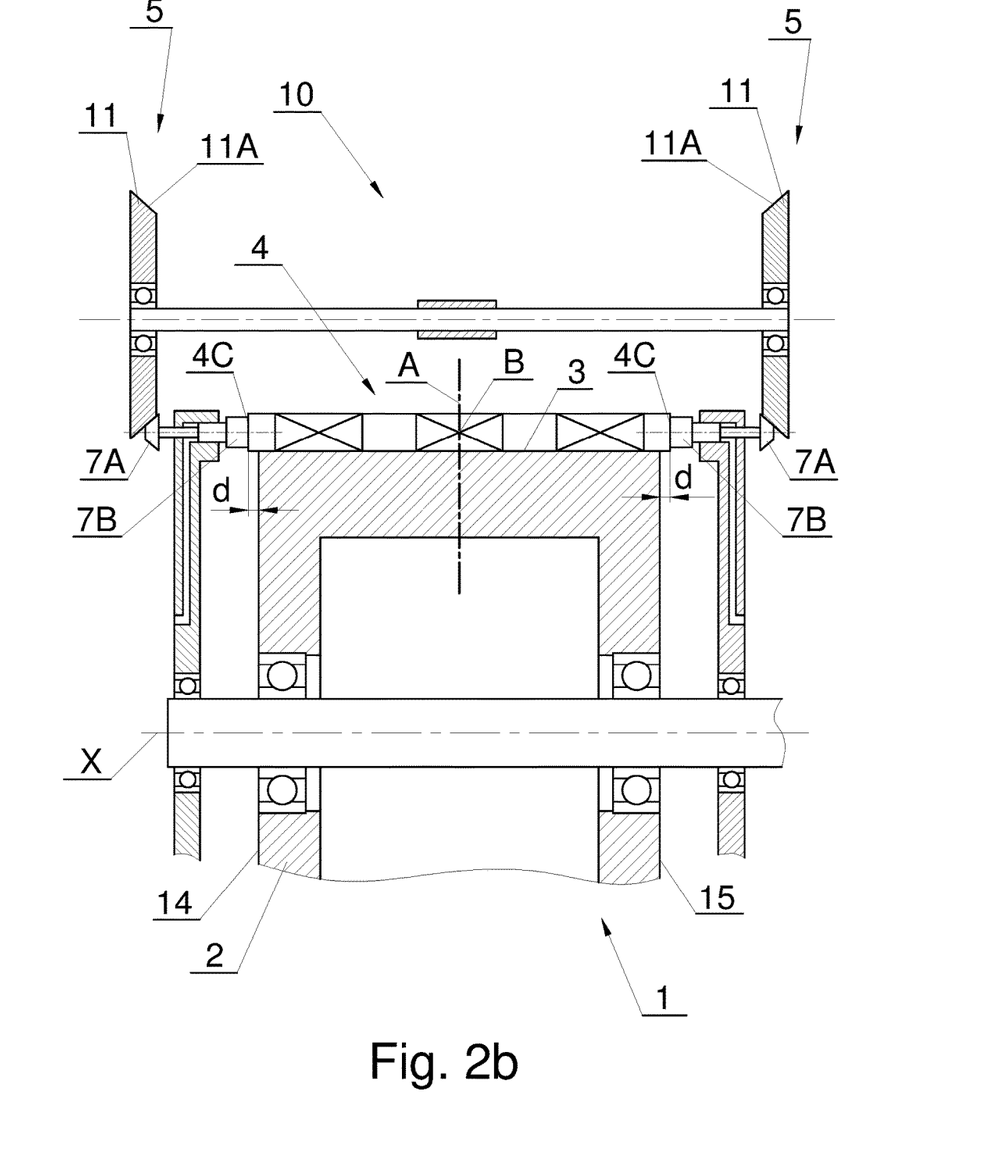

FIGS. 2a and 2b show a plane A perpendicular to the axis X which in a particular case may be a symmetry plane of the drum 2, i.e. the symmetry plane for the front surfaces 14 and 15 of the drum 2. The plane A may overlap the plane of a not shown circular knife used to cut the article 4 into two parts, whereas the cutting of the article may take place further on the same drum conveyor 2 or on another mating drum. The shown example of the rod-like article 4 has its geometric centre at the point designated as B, and as can be seen in FIG. 2a it does not lie in the plane A. The front surfaces 7D of the pusher elements 7 are situated symmetrically to the plane A. The distances of the ends 4C of the shown rod-like article 4 from the front surfaces 7D are described as the dimensions e1 and e2, whereas due to the asymmetrical position of the article 4 the dimension e1 is greater than e2. Also the distances d1 and d2 of the ends 4C of the rod-like article 4 from the drum's front surfaces 14 and 15 are shown, the surfaces 14 and 15 being situated symmetrically to the plane A and the dimension d2 being greater than d1. The retracted (initial) position of the pusher elements 7, as shown in FIG. 2a, is maintained by means of negative pressure supplied through channels 9 made in the discs 8. The negative pressure ensures the retraction of the pusher element 7 after shifting the rod-like article 4 when the pusher element loses contact with the surface 11A. In the retracted position, the cylindrical elements 7B of the pusher elements 7 may abut the surfaces 8A of the discs 8.

The pushing unit 5 is provided with a rotational pushing element 11 in the form of a roller having the axis of rotation Y. The pushing roller 11 has a circumferential surface 11A in the form of a conical surface and is mounted on a shaft 12 which is swing-mounted on a lever 13, whereas the lever 13 is rotatably mounted on the axis Z (FIG. 1). On the same shaft 12, a second rotational pushing element 11 also in the form of a roller belonging to a second pushing unit 5 is mounted. The rollers 11 are situated at the right angle to the axis of the rod-like articles 4. A force is exerted on the lever 13 through the spring 16 which causes the pressure of the circumferential surfaces 11A of the rotational pushing elements 11 on the portion 7A of the pusher elements 7. The pushing units move substantially transversely to the axis of the flute 3 of the drum 2. During the rotation of the drum 2, the circumferential surfaces 11A successively come into contact with the surfaces 7A of the pusher elements 7. FIG. 2a shows a situation when the article 4 has been placed into the flute 3 of the drum 2 and has not yet been shifted so that its centre B finds itself in the symmetry plane A of the drum 2, the pushing rollers 11 abut against the portions 7A, but the process of pushing the pusher elements 7 against the rod-like articles 4 has not yet started. FIG. 2b shows a situation when the pusher elements have taken the pulled out (final) position and the process of shifting, in this case centering of the rod-like article 4, has been completed. The position of the ends 4C of the rod-like article 4 is defined by the front surfaces 7D of the pusher elements 7 following the shift of the pusher elements 7, and the portions 7A have changed their position relative to the conical surfaces 11A of the pushing units 5. After the shift, the ends 4C of the rod-like article 4 protrude beyond the front surfaces 14 and 15 of the drum 2 at the same distance d. The force exerted by the spring 16 is transferred by the rotational pushing elements 11 and the pusher elements 7 on the ends 4C of the article 4. The spring force is selected in such a way that the ends 4C of the article 4 are not damaged. Each successive rod-like article 4 conveyed in the successive flute 3 is centered in a repeatable manner relative to the fixed plane A by means of the pusher elements 7 which are pushed against it by the pushing unit. The plane A does not have to be the symmetry plane of the drum 2, it may be independent of the drum structure. The pushing unit 10 places the articles 4, 4' in a fixed position being symmetrical to the pusher elements 7 independently of their actual length resulting from the length tolerance achieved during the production of the articles 4, 4'. The range of movements of the pusher elements 7 within which the centering function is accomplished is selected so as to include the position of the pusher elements 7 for both maximum and minimum length of the rod-like article 4, 4', whereas the rod like articles 4, 4' always take a symmetrical position relative to the plane A.

The apparatus for shifting of rod-like articles according to the invention may also be used for a group of several rod-like articles not wrapped with a common wrapping material (FIG. 3*a*), for example for a group 6 comprising a tobacco rod 6A, a filter rod 6B and a tobacco rod 6A, where from such group two cigarettes after prior wrapping of the filter rod 6B and the ends of the tobacco rods 6A with a paper wrapper will be manufactured. The apparatus shown may also be used for individual rod-like articles, for example filter rods 4' made of a single type of material (FIG. 6), whereas it may be a filter rod provided with a wrapping material or without a wrapping material, for example a non wrapped acetate rod.

Figure 3A:
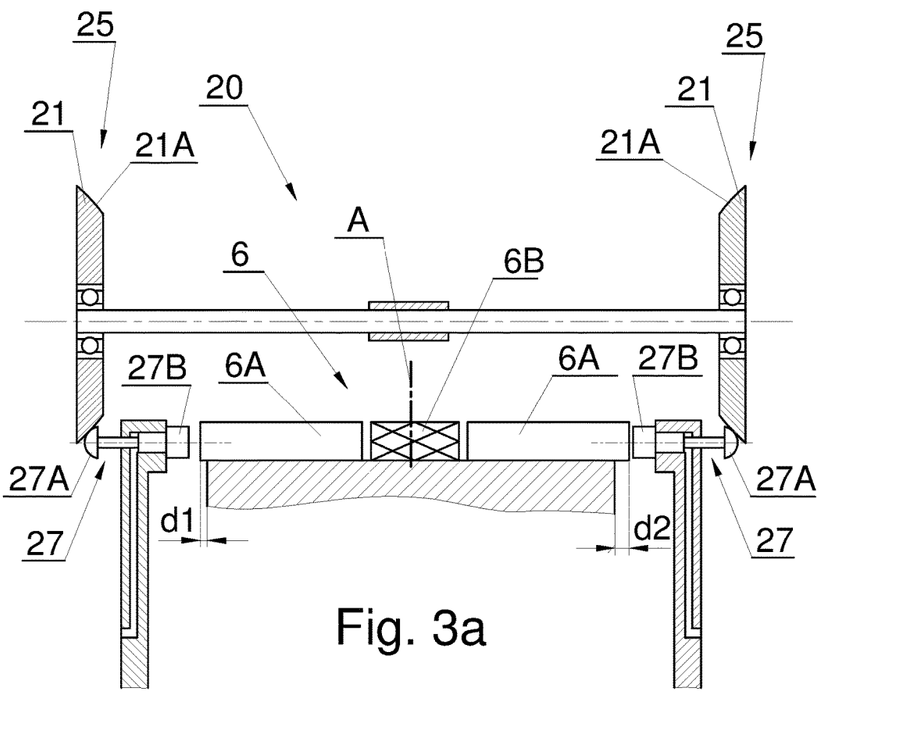
FIG. 3a, 3b—show an axial section through the conveyor of FIG. 1 in the initial and final stages of shifting of rod-like articles in a flute of the conveyor in a second embodiment.
Figure 3B:
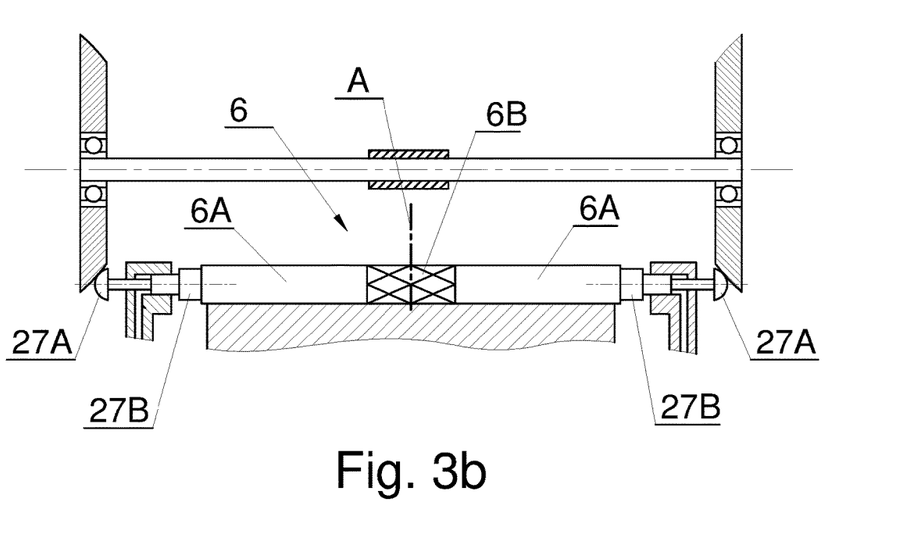

FIGS. 3*a* and 3*b* show the apparatus 20 for shifting of rod-like articles according to the invention in a second embodiment for a group 6 comprising three rod-like articles, namely two tobacco rods 6A and one filter rod 6B, whereas the pusher elements 27 comprise spherical elements 27A which come into contact with spherical circumferential surfaces 21A of the rotational pushing elements 21, the elements 21 of each of the pushing units 25 being situated at the right angle to the axis of the rod-like articles 4. FIG. 3*a* shows a situation when pushing of the articles 6A and 6B to abut against each other has started, while FIG. 3*b* shows a situation when pushing of the articles to abut against each other has finished. During the rotation of the drum 2, the pusher elements 27 come into contact with the circumferential surface 21 A belonging to the pushing unit 25 and, under the influence of the force transferred to the elements 27A, they are shifted towards the ends of the rods 6A; after pushing the tobacco rods 6A to abut against the filter rod 6B by means of the elements 27B, the group 6 is centered so that the geometric centre of the group is situated in the fixed plane A (FIG. 3*b*).

Figure 4A:
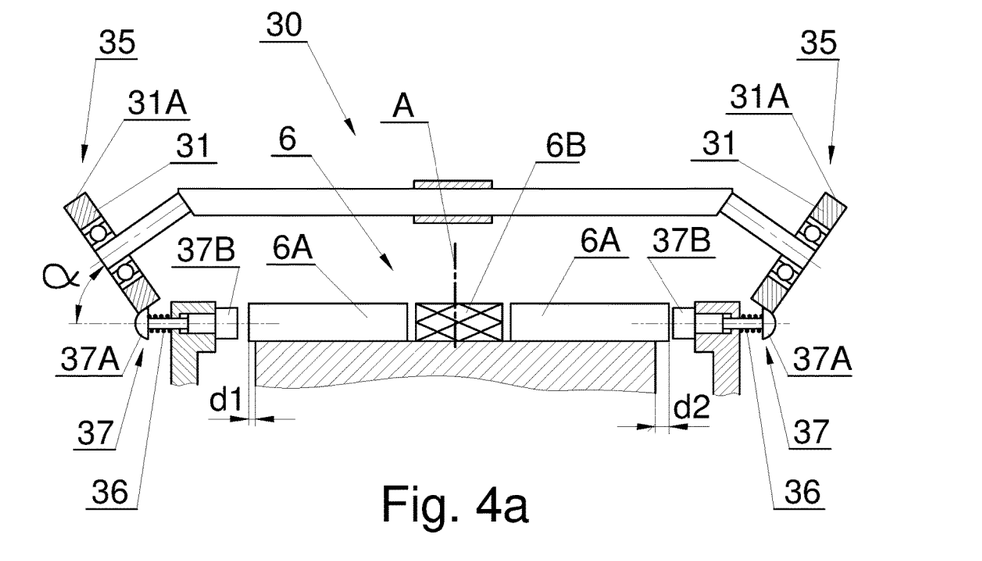
FIG. 4a, 4b—show an axial section through the conveyor of FIG. 1 in the initial and final stages of shifting of rod-like articles in a flute of the conveyor in a third embodiment.
Figure 4B:
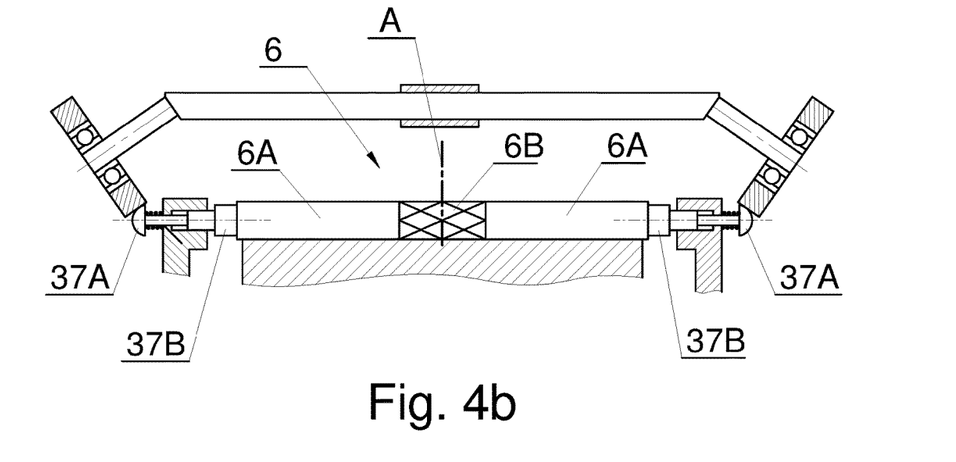
Figure 5:
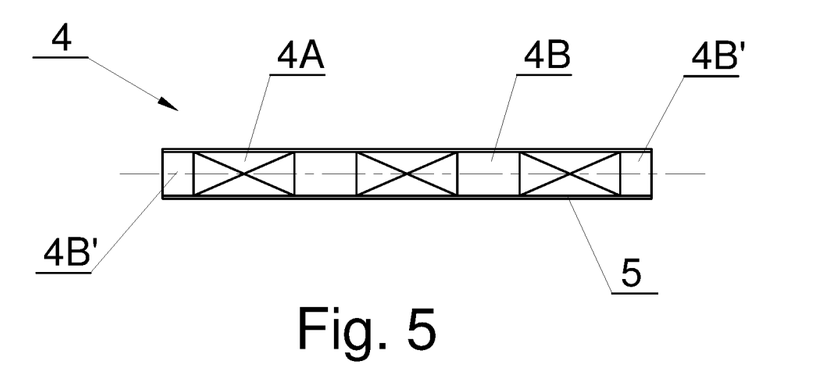
FIG. 5—shows a rod consisting of a plurality of rod-like articles.

FIGS. 4*a* and 4*b* show the apparatus 30 for shifting of rod-like articles according to the invention in a fourth embodiment for a group 6 comprising three rod-like articles 6A, 6B and 6A, whereas the rollers 31 are inclined at the angle α to the axis of the rod-like articles, and the pusher elements 37 comprise spherical elements 37A which come into contact with cylindrical circumferential surfaces 31A of the rotational pushing elements 31 belonging to the pushing units 35. In this embodiment, the pusher elements 37 are pushed outside the drum 2 by means of the springs 36. Similar to the previous embodiments, FIG. 4*a* shows the moment of commencement of shifting of the articles 6A, 6B and 6A, whereas FIG. 4*b* shows the moment of finish of shifting of these articles. Similar to the previous embodiments, the elements 37B, symmetrically spaced relative to the plane A, push individual articles 6A, 6B and 6A to abut against to each other and fix their position relative to the plane A.

Figure 7:
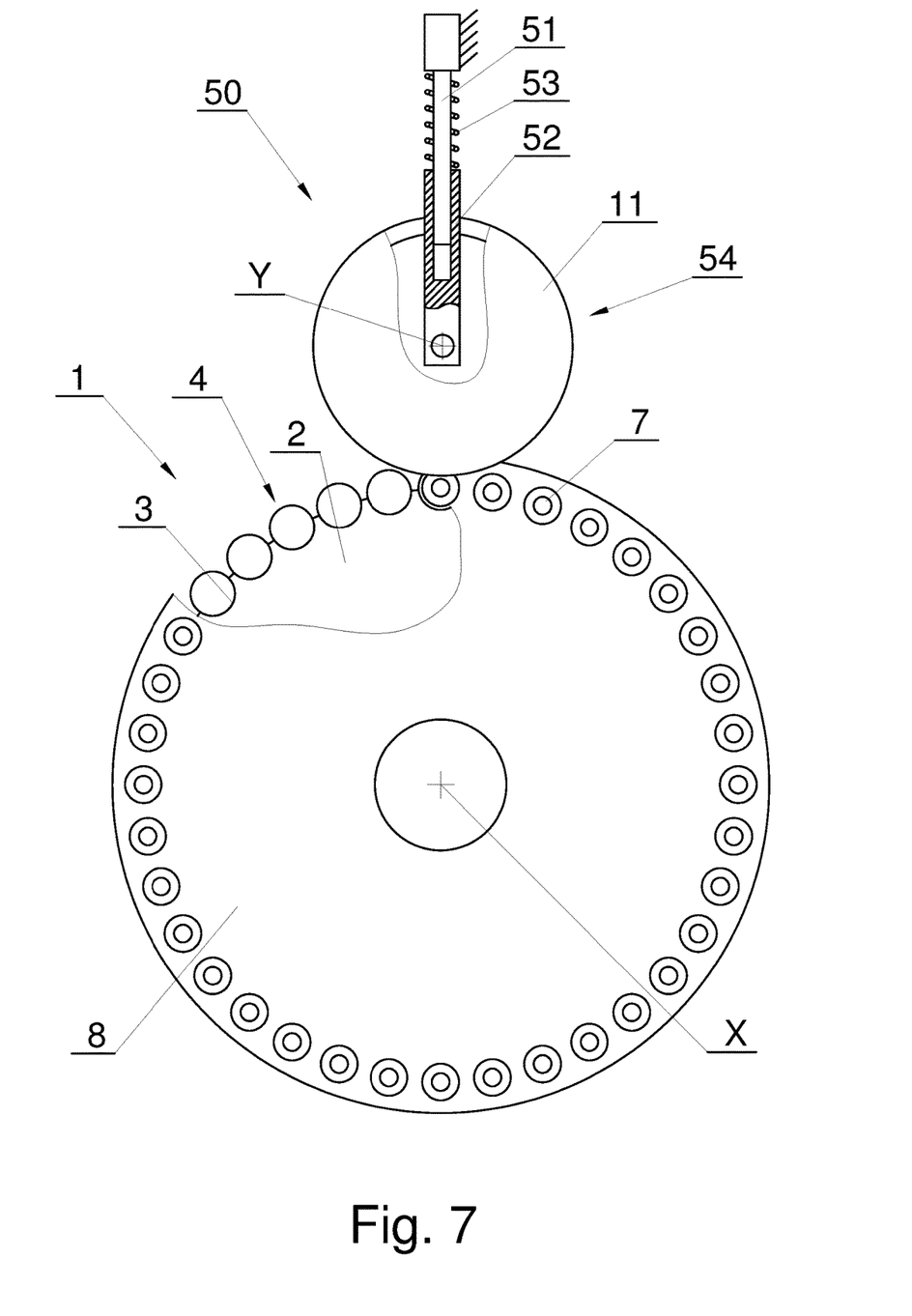
FIG. 7—shows a second variant of the drum conveyor in an axial view.

FIG. 7 shows an apparatus 50 for shifting of rod-like articles according to the invention in a vertical operation system. The pushing unit 54 is slidably mounted essentially vertically by means of two elements 51 and 52, whereas a spring 53 for pushing of rotational pushing elements 11, or other from the embodiments shown, to abut against the pusher elements 7 was used. The pushing unit may be any of the units presented above.

The invention claimed is:

1. A method for shifting of rod-like articles comprising the steps of:
   conveying at least one rod-like article (4, 4') or a rod-like article group (6) in a flute (3) situated on the circumference of a drum conveyor (2), wherein the position of the rod-like articles (4, 4') or the position of the rod-like article groups (6) in successive flutes (3) vary,
   shifting a pushing unit (5, 25, 35) in a direction being substantially transverse to the axis of the flute (3) of the drum conveyor (2) by surfaces (11A, 21A, 31A) of the pushing unit (5, 25,35) which are disposed angularly relative to pusher elements (7, 27, 37) and slidably mounted in the direction of the axis of the flute (3), wherein the force exerted by the pushing unit (5, 25, 35) is directed on the pusher elements (7,27, 37), and
   axially shifting the rod-like articles (4, 4') or the rod-like article groups (6) in the flutes (3) by the pusher elements (7,27,37).

2. The method as in claim 1 further comprising the steps of:
   providing at least two pushing units (5, 25, 35) mounted on both sides of the flute (3) of the drum conveyor (2) which are angularly shifted relative to the pusher elements (7, 27, 37) substantially in the direction of the axis of the rod-like article (4,4') or the rod-like article group (6),
   directing a force on the pusher elements (7, 27, 37) by the surfaces (11A, 21A, 31A) of the at least two pushing units (5, 25, 35) mounted on both sides of the flute (3) of the drum conveyor, and
   axially shifting by the pusher elements (7, 27, 37) the rod-like articles (4, 4') or the rod-like article groups (6) in the flutes (3) so that the centers of the rod-like articles (4, 4') or the rod-like article groups (6) in the flutes (3) of the drum conveyor (2) are positioned substantially in a common plane.

3. An apparatus (10, 20, 30) for shifting of rod-like articles (4, 4') with different lengths or rod-like article groups (6) with different total lengths on a drum conveyor (3), comprising
   slidably mounted pusher elements (7, 27, 37) acting on at least one rod-like article (4, 4') or at least one rod-like article group (6) so as to vary their position in the flute (3) of the drum conveyor (2), wherein the slidably mounted pusher elements (7, 27, 37) are slidable in a direction which substantially corresponds to the axis of the rod-like articles, and
   a pushing unit (5, 25, 35) mounted angularly relative to the slidably mounted pusher elements (7, 27, 37) and forcing a movement of the slidably mounted pusher elements (7, 27, 37), wherein the pushing unit comprises rotational pushing elements for pushing against the slidably mounted pusher elements (7, 27, 37), characterized in that the pushing unit (5, 25, 35) is movably mounted in a direction being substantially transverse to the axis of the flute (3) of the drum conveyor (2) so as to shift the rod-like articles (4, 4') or the rod-like article groups (6) inside the flute (3) of the drum conveyor (2).

4. The apparatus as in claim 3 characterized in that at least two slidably mounted pusher elements (7, 27, 37) mounted on both sides of the flute (3) of the drum conveyor, acting on at least one rod-like article (4, 4') or at least one rod-like article group (6) so as to vary their position in the flute (3) of the drum conveyor (2), and at least two pushing units (5, 25, 35) mounted angularly relative to the at least two slidably mounted pusher elements (7, 27, 37) on both sides of the flute (3) of the drum conveyor (2), wherein the at least two pushing units (5, 25, 35) are moveably mounted in a direction being substantially transverse to the axis of the flute (3) of the drum conveyor (2) so as to shift, through the at least two slidably mounted pusher elements (7, 27, 37), the rod-like articles (4, 4') or the rod-like article groups (6) inside the flute (3) of the drum conveyor (2) so that the centers of the rod-like articles (4, 4') or the rod-like article groups (6) in the flutes (3) of the drum conveyor (2) position themselves substantially in a common plane.

5. The apparatus as in claim 3 characterized in that the contact of the rotational pushing elements (11, 21, 31) of the pushing unit (5, 25, 35) with the slidably mounted pusher element (7, 27, 37) is accomplished by a spring (16, 53).

6. The apparatus as in claim 3 characterized in that the rotational pushing elements (11, 21, 31) have circumferential surfaces (11A, 21A, 31A) selected from the group: conical, spherical, cylindrical, paraboloidal surface.

7. The apparatus as in claim 3 characterized in that the slidably mounted pusher elements (7, 27, 37) have surfaces remaining in contact with the rotational pushing elements (11, 21, 31) selected form the group: conical, spherical, cylindrical, paraboloidal surface.

8. The apparatus as in claim 3 characterized in that the slidably mounted pusher elements (7, 27, 37) are pneumatically moved outside the drum conveyor (2).

9. The apparatus as in claim 3 characterized in that the slidably mounted pusher elements (7, 27, 37) are moved outside the drum conveyor (2) by a spring.

10. The apparatus as in claim 3 characterized in that the slidably mounted pusher elements (7, 27, 37) are mounted in rotational rings (8).

11. The apparatus as in claim 3 characterized in that the slidably mounted pusher elements (7, 27, 37) have an axis of rotation being parallel to the axis of the drum conveyor (2).

* * * * *